United States Patent
Sundararajan et al.

(10) Patent No.: US 10,415,450 B2
(45) Date of Patent: Sep. 17, 2019

(54) SYSTEMS AND METHODS FOR REDUCTANT DOSING INCLUDING ON-TIME CORRECTION FOR SWITCHING DELAYS

(71) Applicant: Cummins Emission Solutions Inc., Columbus, IN (US)

(72) Inventors: Vikram Sundararajan, Columbus, IN (US); Joe V. Hill, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 151 days.

(21) Appl. No.: 15/799,212

(22) Filed: Oct. 31, 2017

(65) Prior Publication Data

US 2019/0128165 A1    May 2, 2019

(51) Int. Cl.
*F02D 41/20* (2006.01)
*F01N 3/20* (2006.01)

(52) U.S. Cl.
CPC ...... *F01N 3/208* (2013.01); *F01N 2900/1821* (2013.01)

(58) Field of Classification Search
CPC ..... F02D 2041/2024; F02D 2041/2027; F02D 2041/2031; F02D 2041/2055; F02D 2041/2058; F02D 2041/2065; F01N 3/208; F01N 2610/02; F01N 2610/146; F01N 2900/1811; F01N 2900/1821
See application file for complete search history.

(56) References Cited

U.S. PATENT DOCUMENTS

| | | | |
|---|---|---|---|
| 6,148,800 A * | 11/2000 | Cari | F02D 41/20 123/490 |
| 8,656,890 B2 | 2/2014 | Farah et al. | |
| 2012/0080536 A1 | 4/2012 | Parrish et al. | |

(Continued)

FOREIGN PATENT DOCUMENTS

| | | |
|---|---|---|
| DE | 10 2013 201 777 A1 | 8/2014 |
| EP | 2 738 375 A2 | 6/2014 |

(Continued)

OTHER PUBLICATIONS

Machine translation of JP-08004575-A, accessed on May 21, 2019. (Year: 2019).*

(Continued)

*Primary Examiner* — Jonathan R Matthias
(74) *Attorney, Agent, or Firm* — Foley & Lardner LLP

(57) ABSTRACT

A controller includes a switching delay circuit structured to determine an open delay time and a close delay time for a reductant injector, each based on battery voltage and reductant injector coil temperature. A dosing circuit is structured to determine an open time that the armature pin must be in the fully open position so as to cause the injector to inject a first quantity of reductant. An actuation time is determined based on each of the open time, the open delay time, and the close delay time. The actuation time relates to a time that the coil must be energized so as to cause the injector to inject the first quantity of reductant. A switching command signal is transmitted to the injector to energize the coil for the calculated actuation time so as to cause the injector to inject the first quantity of reductant into an exhaust gas stream.

25 Claims, 3 Drawing Sheets

(56) References Cited

U.S. PATENT DOCUMENTS

| | | |
|---|---|---|
| 2013/0055701 A1 | 3/2013 | Yan et al. |
| 2014/0053537 A1 | 2/2014 | Yan et al. |
| 2016/0138511 A1* | 5/2016 | Toyohara ................ F02D 41/20 123/478 |
| 2017/0292422 A1 | 10/2017 | Zhang |

FOREIGN PATENT DOCUMENTS

| | | | |
|---|---|---|---|
| JP | 07103020 A | * | 4/1995 |
| JP | 08004575 A | * | 1/1996 |
| WO | WO-2017/097776 A1 | | 6/2017 |

OTHER PUBLICATIONS

Machine translation of JP-07103020-A, accessed on May 21, 2019. (Year: 2019).*
International Search Report and Written Opinion issued for PCT/US2018/057985, dated Jan. 4, 2019, 7 pages.

\* cited by examiner

SYSTEMS AND METHODS FOR REDUCTANT DOSING INCLUDING ON-TIME CORRECTION FOR SWITCHING DELAYS

TECHNICAL FIELD

The present disclosure relates generally to the field of selective catalytic reduction ("SCR") systems for use in exhaust aftertreatment systems.

BACKGROUND

In general, regulated emissions for internal combustion engines include carbon monoxide (CO), hydrocarbons (HC), nitrogen oxides ($NO_x$) and particulates. Such regulations have become more stringent over recent years. For example, the regulated emissions of $NO_x$ and particulates from diesel-powered engines are low enough that, in many cases, the emissions levels cannot be met with improved combustion technologies alone. To that end, exhaust after-treatment systems are increasingly utilized to reduce the levels of harmful exhaust emissions present in exhaust gas.

Conventional exhaust gas after-treatment systems include any of several different components to reduce the levels of regulated pollutants present in exhaust gas. For example, SCR catalysts are structured to convert $NO_x$ (NO and $NO_2$ in some fraction) into nitrogen gas ($N_2$) and water vapor ($H_2O$). A reductant (typically ammonia ($NH_3$) in some form) is added to the exhaust gas upstream of the catalyst. The $NO_x$ and $NH_3$ pass over the catalyst and a catalytic reaction takes place in which $NO_x$ and $NH_3$ are converted into $N_2$ and $H_2O$.

In many conventional SCR systems, $NH_3$ is used as a reductant. Typically, pure $NH_3$ is not directly used due to safety concerns, expense, weight, lack of infrastructure, and other factors. Instead, many conventional systems utilize diesel exhaust fluid ("DEF"), which typically is a urea-water solution. To convert the DEF into $NH_3$, the DEF is injected into a decomposition tube through which an exhaust stream flows. The injected DEF spray is heated by the exhaust gas stream to vaporize the urea-water solution and trigger the decomposition of urea into $NH_3$. The exhaust gas mixture, including the $NH_3$ decomposed from the urea, further mixes while flowing through the decomposition tube and passes over the SCR catalyst, where the NOx and $NH_3$ are converted primarily to $N_2$ and $H_2O$.

SUMMARY

Various embodiments relate to a controller including a switching delay circuit structured to determine an open delay time based on battery voltage and reductant injector coil temperature. The open delay time relates to a first amount of time required for an armature pin of a reductant injector to reach a fully open position from a fully closed position in response to a reductant injector coil of the reductant injector being energized. A close delay time is determined based on battery voltage and reductant injector coil temperature. The close delay time relates to a second amount of time required for the armature pin to reach the fully closed position from the fully open position in response to the reductant injector coil being de-energized. A dosing circuit is structured to determine an open time relating to a third amount of time that the armature pin must be in the fully open position so as to cause the reductant injector to inject a first quantity of reductant. An actuation time is determined based on each of the open time, the open delay time, and the close delay time. The actuation time relates to a fourth amount of time that the reductant injector coil must be energized so as to cause the reductant injector to inject the first quantity of reductant. A switching command signal is transmitted to the reductant injector to energize the reductant injector coil for the calculated actuation time so as to cause the reductant injector to inject the first quantity of reductant into an exhaust gas stream.

Various other embodiments relate to a method including determining an open delay time based on battery voltage and reductant injector coil temperature. The open delay time relates to a first amount of time required for an armature pin of a reductant injector to reach a fully open position from a fully closed position in response to a reductant injector coil of the reductant injector being energized. A close delay time is determined based on battery voltage and reductant injector coil temperature. The close delay time relates to a second amount of time required for the armature pin to reach the fully closed position from the fully open position in response to the reductant injector coil being de-energized. An open time relating to a third amount of time that the armature pin must be in the fully open position so as to cause the reductant injector to inject a first quantity of reductant is determined. An actuation time is determined based on each of the open time, the open delay time, and the close delay time. The actuation time relates to a fourth amount of time that the reductant injector coil must be energized so as to cause the reductant injector to inject the first quantity of reductant. A switching command signal is transmitted to the reductant injector to energize the reductant injector coil for the calculated actuation time so as to cause the reductant injector to inject the first quantity of reductant into an exhaust gas stream.

Various other embodiments relate to system including a battery and a reductant injector. The reductant injector includes a coil and an armature pin in operative engagement with the coil. The armature pin is structured to move between a fully closed position and a fully open position in response to the coil being energized. A controller is operatively coupled to the battery and the injector. The controller is structured to interpret a battery voltage of the battery and interpret a coil temperature of the coil. An open delay time is determined based on the battery voltage and the coil temperature. A close delay time is determined based on the battery voltage and the coil temperature. An open time relating to a first amount of time that the armature pin must be in the fully open position so as to cause the reductant injector to inject a first quantity of reductant is determined. An actuation time is determined based on each of the open time, the open delay time, and the close delay time. The actuation time relates to a second amount of time that the reductant injector coil must be energized so as to cause the reductant injector to inject the first quantity of reductant. A switching command signal is transmitted to the reductant injector to energize the reductant injector coil for the calculated actuation time so as to cause the reductant injector to inject the first quantity of reductant into an exhaust gas stream.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims.

Figure 1:
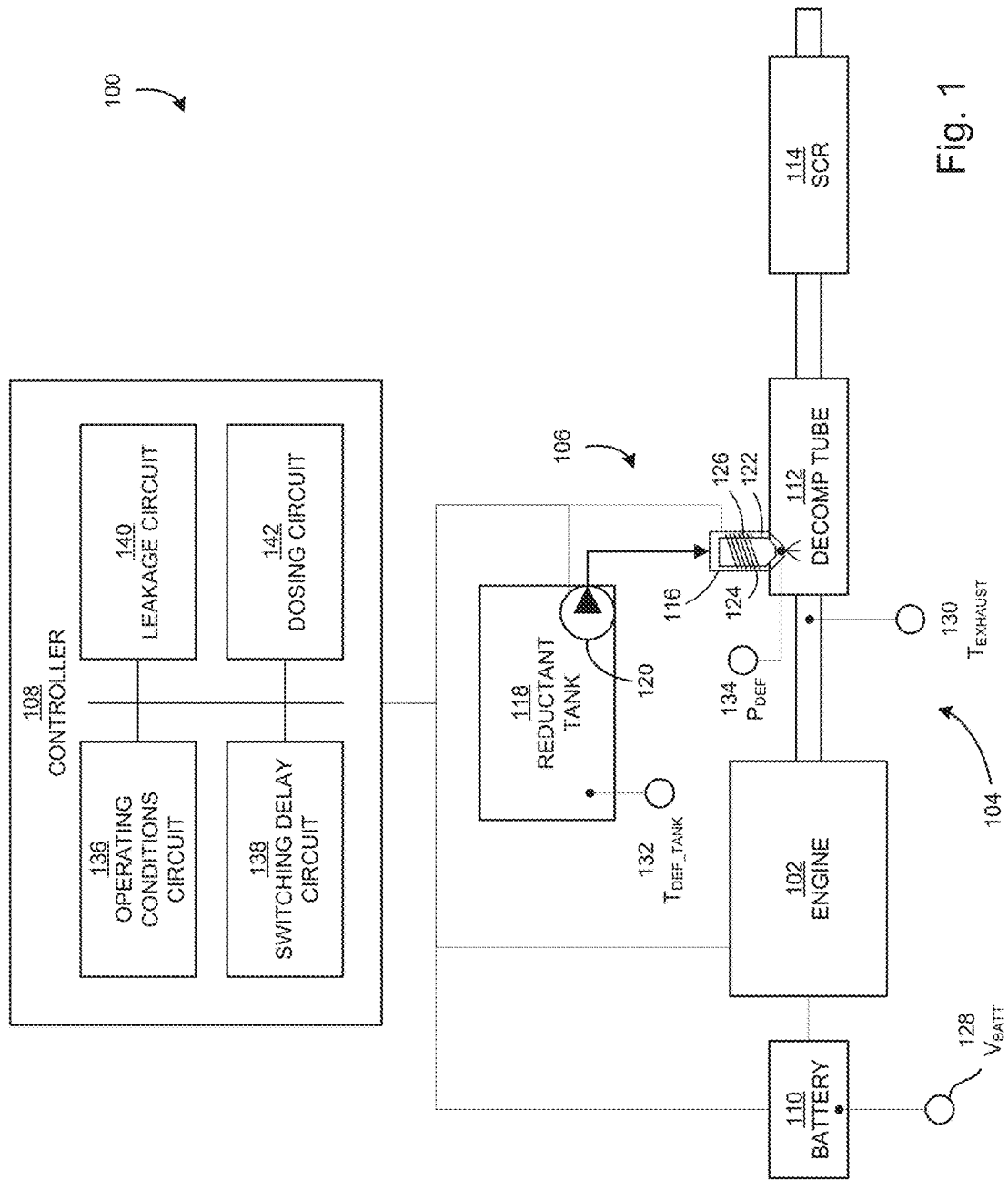
FIG. 1 is a schematic block diagram illustrating an engine system, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Reductant dosing systems are structured to inject a precise amount of reductant into an exhaust gas stream. The precise amount of reductant is defined so as to enable the SCR catalyst to reduce NOx levels in the exhaust gas to an acceptable level while avoiding NH$_3$ slip. NH$_3$ slip is caused by injecting an excessive amount of reductant into the exhaust gas stream so that some NH3 passes through the SCR catalyst un-reacted. The un-reacted caustic NH$_3$ can be expelled to the external atmosphere and can accumulate on other components of the exhaust aftertreatment system, thereby degrading performance.

In operation, the amount of reductant that is injected into the exhaust gas stream can be different than the intended amount. Reductant injectors include a coil and an armature pin structured to move between closed and open positions in response to power being provided to the coil. However, in operation, the armature pin does not move instantaneously in response to power being provided to the coil. The amount of time required for the armature pin to move between closed and open positions in response to energizing or de-energizing the coil is referred to as switching delay. Existing reductant dosing systems fail to account fully for reductant dosing errors caused by switching delays.

Various embodiments relate to systems and methods for controlling reductant injection into an exhaust aftertreatment system by adjusting reductant dosing on-time to compensate for switching delays of the reductant injector. Switching delays include an open delay time and a close delay time that are each determined based on at least one of battery voltage, reductant injector coil temperature, and reductant pressure. The open delay time relates to a first amount of time required for the armature pin to reach a fully open position from a fully closed position in response to the coil being energized. The close delay time relates to a second amount of time required for the armature pin to reach the fully closed position from the fully open position in response to the coil being de-energized.

A target open time is calculated. The target open time relates to a third amount of time that the armature pin must be in the fully open position so as to cause the reductant injector to inject a target quantity of reductant, absent switching losses.

An actuation time is determined based on each of the open time, the open delay time, and the close delay time. The actuation time relates to a fourth amount of time that the coil must be energized so as to cause the reductant injector to inject the first quantity of reductant. Accordingly, the actuation time accounts for the switching losses.

A switching command signal is transmitted to the reductant injector to energize the coil for the calculated actuation time so as to cause the reductant injector to inject the first quantity of reductant into an exhaust gas stream.

FIG. 1 is a schematic block diagram illustrating an engine system 100, according to an example embodiment. The engine system 100 includes an engine 102, an exhaust aftertreatment system 104, a reductant dosing system 106, a controller 108, and a battery 110.

Generally, the exhaust aftertreatment system 104 is configured to remove regulated pollutants present in exhaust gas produced by the engine 102. The exhaust aftertreatment system 104 is in exhaust gas communication with the engine 102. The exhaust aftertreatment system 104 includes a decomposition tube 112 and an SCR catalyst 114 positioned downstream of the decomposition tube 112. Although not shown in FIG. 1, the exhaust aftertreatment system 104 may also include various other aftertreatment components, such as a DOC, a particulate filter (such as a diesel particulate filter (DPF), an ammonia oxidation (AMOX) catalyst, a NOx storage catalyst, etc.

The decomposition tube 112 is structured to convert a reductant, such as urea, aqueous ammonia, or DEF, into ammonia. As will be appreciated, the reductant dosing system 106 is structured to controllably inject reductant into the decomposition tube 112. The reductant injected into the decomposition tube 112 undergoes processes of evaporation, thermolysis, and hydrolysis to form gaseous ammonia within the exhaust aftertreatment system 104.

The SCR catalyst 114 is structured to reduce NOx emissions from the exhaust aftertreatment system 104 by accelerating a NOx reduction process between the ammonia and the NOx of the exhaust gas into $N_2$, $H_2O$, and/or $CO_2$.

The reductant dosing system 106 includes a reductant injector 116, a reductant tank 118, and a reductant pump 120. The reductant injector 116 is fluidly and operatively coupled to (in reductant receiving communication with) the reductant tank 118 and the reductant pump 120. The reductant injector 116 is operatively coupled to the decomposition tube 112 to controllably inject reductant into the exhaust gas stream passing therethrough.

The reductant injector 116 includes an armature pin 122 positioned within a housing 124. A coil 126 extends around the armature pin 122. The armature pin 122 is structured to move between closed and open positions in response to power being provided to the coil 126. Accordingly, the timing and amount of reductant that is injected into the decomposition tube 112 is controlled by controlling the power provided to the coil 126.

In operation, the armature pin 122 does not move instantaneously in response to power being provided to the coil 126. The term "anchor open delay" refers to an amount of time elapsed until the armature pin 122 begins to move from a closed position to an open position in response to power being provided to the coil 126. The term "anchor close delay" refers to an amount of time elapsed until the armature pin 122 begins to move from the open position to the closed position in response to power being removed from the coil 126. The term "open delay" refers to an amount of time elapsed until the armature pin 122 reaches an open position from a closed position in response to power being provided to the coil 126. The term "close delay" refers to an amount of time elapsed until the armature pin 122 reaches a closed position from an open position in response to power being removed from the coil 126. As will be appreciated, the controller 108 is structured to adjust injector control signals (e.g., switching command signals) to account for such delays.

The engine system 100 also includes various sensors in operative communication with the controller 108. For example, as illustrated in FIG. 1, the engine system 100 includes a battery voltage sensor 128, an exhaust temperature sensor 130, a reductant tank temperature sensor 132, and an injection pressure sensor 134. It should be appreciated that the engine system 100 includes many more sensors than those shown in FIG. 1. The battery voltage sensor 128 is structured to measure a voltage across the battery 110 ($V_{BATT}$). The exhaust temperature sensor 130 is structured to measure a temperature of exhaust gas ($T_{EXHAUST}$) upstream of the decomposition tube 112. The reductant tank temperature sensor 132 is structured to measure a temperature of reductant in the reductant tank 118 ($T_{DEF\_TANK}$). The injection pressure sensor 134 is structured to measure a pressure of the reductant at the reductant injector 116 ($P_{DEF}$).

The controller 108 is communicatively and operatively coupled to various components of the engine system 100, such as the engine 102, the battery 110, the reductant injector 116, the reductant pump 120, the battery voltage sensor 128, the exhaust temperature sensor 130, the reductant tank temperature sensor 132, the injection pressure sensor 134, and other components. In some embodiments, the controller 108 is an engine control module ("ECM"). In other embodiments, the controller 108 is an exhaust aftertreatment controller. The controller 108 is structured to control operation of the engine system 100 based on monitored operating conditions. For example, the controller 108 is structured to monitor operating conditions by interpreting measurement values received from any of the battery voltage sensor 128, the exhaust temperature sensor 130, the reductant tank temperature sensor 132, the injection pressure sensor 134, and other sensors and devices.

As will be appreciated, various factors can affect movement of the armature pin 122 in response to power being provided to the coil 126. For example, voltage of the battery 110, temperature of the coil 126, and pressure of the injected reductant can each affect the response of the armature pin 122. Several other factors, such as exhaust temperature, reductant temperature, and reductant dosing amount can also affect the response of the armature pin 122. The controller 108 is structured to analyze the factors that affect the response of the armature pin 122 and adjust switching command signals to accommodate for changes in response, such as opening and closing delays, among other factors.

According to various embodiments and as discussed in further detail below, the controller 108 is structured to control operation of the reductant injector 116 and the reductant pump 120 to precisely control the amount and timing of reductant injected into the decomposition tube 112. More specifically, according to various embodiments, the controller 108 is structured to control the reductant injector 116 by dynamically adjusting reductant dosing on-time to compensate for switching delays of the reductant injector 116. In some embodiments, the controller 108 compensates for variations in switching time of the reductant injector 116 as a function of one or more of $V_{BATT}$, injector coil temperature ($T_{COIL}$) and $P_{DEF}$. In some embodiments, the controller 108 is structured to measure switching delays based on monitoring the current provided to the reductant injector 116.

The controller 108 includes an operating conditions circuit 136, a switching delay circuit 138, a leakage circuit 140, and a dosing circuit 142.

The operating conditions circuit 136 is in operative communication with various sensors and devices, such as the battery voltage sensor 128, the exhaust temperature sensor 130, the reductant tank temperature sensor 132, the injection pressure sensor 134, and other sensors and devices. The operating conditions circuit 136 is structured to receive and interpret measurement values from the various devices and sensors. The operating conditions interpreted from the various measurement values are used by other circuits of the controller 108 to control operation of the reductant dosing system 106.

The switching delay circuit 138 is structured to determine delay times associated with switching the reductant injector 116 between open and closed positions. The switching delay circuit 138 is also structured to modify switching command signals to compensate for the determined delay times.

The leakage circuit 140 is structured to determine a leakage quantity (e.g., volume) of reductant leaked from the reductant injector 116 due to switching delays. For example, the leakage circuit 140 compares delay times between providing current to the reductant injector 116 and a corresponding change in pressure of the reductant to determine the leakage quantity between a fully open and fully closed position and vice versa. The leakage circuit 140 is also structured to modify switching command signals to compensate for the leakage.

The dosing circuit 142 is structured to generate and transmit switching command signals to the reductant injector 116 to controllably inject reductant into the decomposition tube 112. The switching command signals are modified by the switching delay circuit 138 and the leakage circuit 140 to account for switching delays.

The switching command signal transmitted to the reductant injector 116 includes a pull-in period followed by a hold period. The pull-in period defines a pull-in time during which a constant amount of power is provided to the reductant injector 116 to energize the coil 126. The hold period, which follows the pull-in period, defines a hold time during which power provided to the reductant injector 116 modulates between on and off levels. An actuation period comprising both the pull-in period and the hold period defines a time during which power is applied to the reductant injector 116 to control reductant dosing therefrom. In other words, the actuation period defines a time during which the coil 126 is energized.

Figure 2:
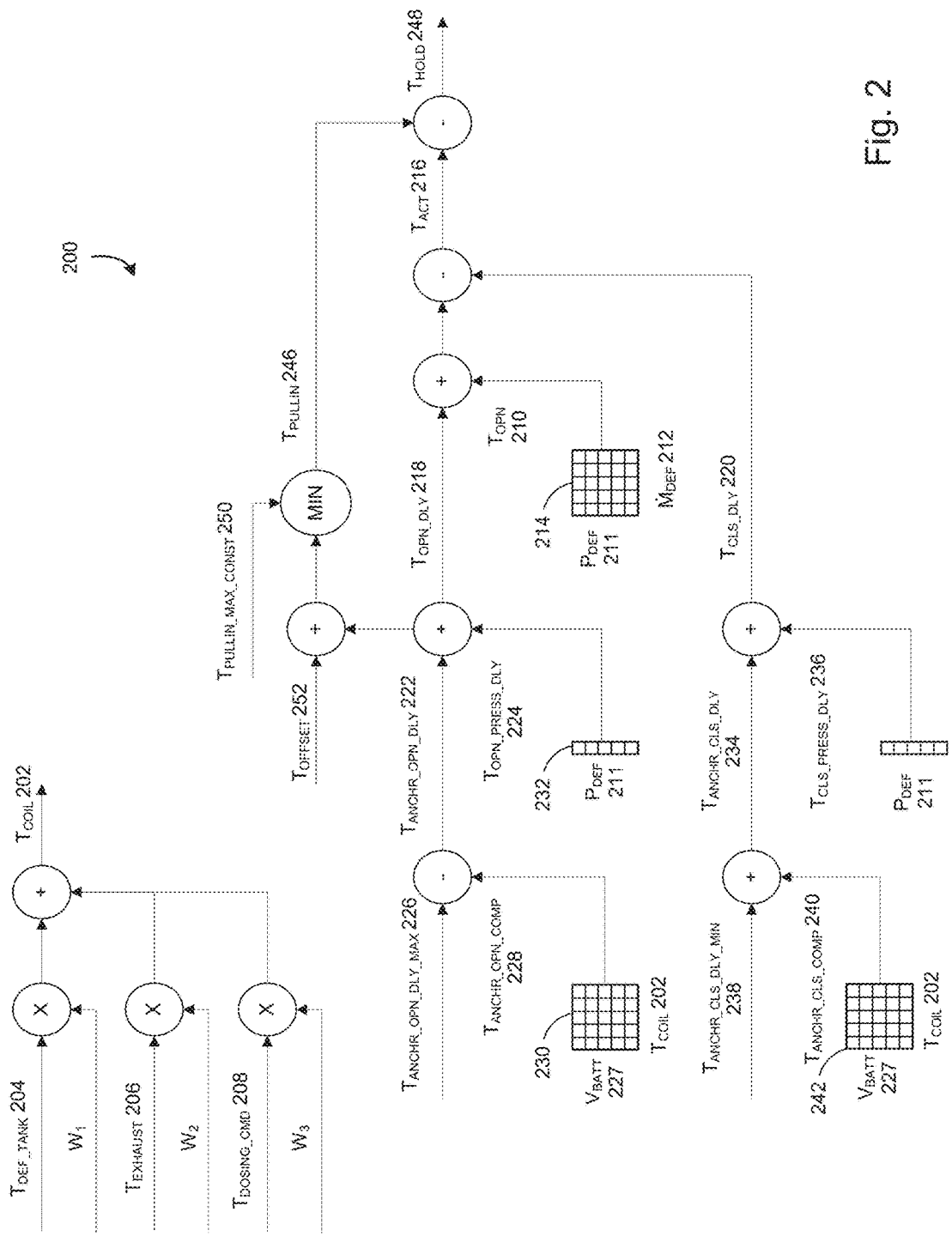
FIG. 2 is a control diagram illustrating a reductant injection control schema, according to an example embodiment.

FIG. 2 is a control diagram illustrating a reductant injection control schema 200, according to an embodiment. The reductant injection control schema 200 may be utilized by the controller 108 (FIG. 1) to control operation of the reductant injector 116. The parameters described in connection with the reductant injection control schema 200 are also illustrated in the injector dosing waveform 300 of FIG. 3, as described in further detail below.

Coil temperature ($T_{COIL}$) 202 may be determined directly (e.g., via a temperature sensor) or indirectly (via other sensors). For example, in one embodiment, the operating conditions circuit 136 includes a virtual temperature sensor that determines coil temperature 202 as a function of reductant tank temperature ($T_{DEF-TANK}$) 204, exhaust temperature ($T_{EXHAUST}$) 206, and reductant dosing command temperature factor ($T_{DOSING-CMD}$) 208. In one embodiment, coil temperature 202 is calculated as a sum of reductant tank temperature 204 multiplied by a first constant $W_1$, exhaust temperature 206 multiplied by a second constant $W_2$, and reductant dosing command temperature factor 208 multiplied by a third constant $W_3$. Put another way, $T_{COIL}$ 202=$T_{DEF\_TANK}$ 204*$W_1$+$T_{EXHAUST}$ 206*$W_2$+ $T_{DOSING\_CMD}$ 208*$W_3$.

Reductant injector valve open time ($T_{OPN}$) 210 is an amount of time that the reductant injector 116 must be in an open position to inject a particular quantity (e.g., mass) of reductant based on reductant pressure ($P_{DEF}$) 211 and reductant flow rate ($M_{DEF}$) 212. Open time 210 is determined via a dosing command table 214 based on reductant pressure 211 and reductant flow rate 212.

Actuation time ($T_{ACT}$) 216 is a total amount of time that the reductant injector 116 is actively being actuated. In one embodiment, actuation time 216 is an amount of time that the coil 126 is energized. In one embodiment, actuation time 216 is an amount of time during which pulse width modulation ("PWM") is active on the reductant injector 116. Actuation time 216 is calculated for a particular $T_{OPN}$ 210. More specifically, actuation time 216 is a sum of (1) open time 210 and (2) a difference between an open delay ($T_{OPN\_DLY}$) 218 and a close delay ($T_{CLS\_DLY}$) 220. Put another way, $T_{ACT}$ 216=$T_{OPN}$ 210+$T_{OPN\_DLY}$ 218−$T_{CLS\_DLY}$ 220.

Open delay time 218 is an amount of time it takes for the armature pin 122 to reach a fully open position from a fully closed position upon the coil 126 being energized. Open delay time 218 is a function of an anchor open delay time ($T_{ANCHR\_OPN\_DLY}$) 222 and an open pressure delay time ($T_{OPN\_PRESS\_DLY}$) 224.

Anchor open delay time 222 is an amount of time until the armature pin 122 begins to move due to magnetic force in response to the coil 126 being energized. The anchor open delay time 222 is a difference between an anchor open delay maximum ($T_{ANCHR\_OPN\_DLY\_MAX}$) 226 and an anchor open delay compensation 228 ($T_{ANCHR\_OPN\_COMP}$). The anchor open delay maximum 226 is a maximum theoretical time required before the armature pin 122 begins to move due to magnetic force in response to the coil 126 being energized. The anchor open delay maximum 226 is a calibratable value that corresponds to a worst case value at a minimum battery voltage 227 and a maximum coil temperature 202. The anchor open delay compensation 228 is a compensation factor for the anchor open delay time 222 relative to the anchor open delay maximum based on instantaneous in-range battery voltage 227 and coil temperature 202 values. Anchor open delay compensation 228 is determined via an anchor open delay compensation table 230 based on battery voltage 227 and coil temperature 202. It should be understood that compensations such as the anchor open delay compensation 228 can be positive or negative depending on the initial conditions of the system, such as the initial conditions of the battery voltage 227 and the coil temperature 202.

Open pressure delay time 224 is an adjustment factor relating to an additional amount of time for the armature pin 122 to move from the fully closed position to the fully open position due to the reductant pressure 211. Open pressure delay time 224 is determined via an open pressure delay table 232 based on the reductant pressure 211.

Close delay time 220 is an amount of time it takes for the armature pin 122 to reach the fully closed position from the fully open position upon the coil 126 being de-energized. Close delay time 220 is a function of an anchor close delay time ($T_{ANCHR\_CLS\_DLY}$) 234 and a close pressure delay time ($T_{CLS\_PRESS\_DLY}$) 236. Anchor close delay time 234 and close pressure delay time 236 are determined in a similar manner as the anchor open delay time 222 and the open pressure delay time 224.

Anchor close delay time 234 is an amount of time until the armature pin 122 begins to move due to magnetic force in response to the coil 126 being de-energized. The anchor close delay time 234 is a sum of an anchor close delay minimum ($T_{ANCHR\_CLS\_DLY\_MIN}$) 238 and an anchor close delay compensation ($T_{ANCHR\_CLS\_COMP}$) 240. The anchor close delay minimum 238 is a minimum theoretical time required before the armature pin 122 begins to move due to magnetic force in response to the coil 126 being de-energized. The anchor close delay minimum 238 is a calibratable value that corresponds to a worst case value at a minimum battery voltage 227 and a maximum coil temperature 202. The anchor close delay compensation 240 is a compensation factor for the anchor close delay time 234 relative to the anchor close delay minimum 238 based on instantaneous in-range battery voltage 227 and coil temperature 202 values. Anchor close delay compensation 240 is determined via an anchor close delay compensation table 242 based on battery voltage 227 and coil temperature 202. It should be understood that the anchor close delay compensation 240 can be positive or negative depending on the initial conditions of the system, such as the initial conditions of the battery voltage 227 and the coil temperature 202.

Close pressure delay time 236 is an adjustment factor relating to an additional amount of time for the armature pin 122 to move from the fully open position to the fully closed position due to the reductant pressure 211. Close pressure delay time 236 is determined via a close pressure delay table 244 based on the reductant pressure 211.

As mentioned above, the switching command signal 302 transmitted by the controller 108 to the reductant injector 116 includes a pull-in period followed by a hold period. The total actuation time 216 is a sum of a pull-in time ($T_{PULLIN}$) 246 of the pull-in period and a hold time ($T_{HOLD}$) 248 of the hold period.

Pull-in time 246 is an amount of time that the coil 126 is energized until the armature pin 122 reaches the fully open position. Pull-in time 246 is determined as a function of the anchor open delay time 222, a maximum pull-in time constant ($T_{PULLIN\_MAX\_CONST}$) 250, and a pull-in offset 252 ($T_{OFFSET}$). The maximum pull-in time constant 250 is a maximum allowable time for the reductant injector 116 to be in the pull-in phase before current consumption limits in the controller 108 are met. The pull-in offset 252 is an amount of time required for the armature pin 122 to reach the fully open position once it begins to move. The pull-in time 246 is the minimum of (1) a sum of the anchor open delay time 222 and the pull-in offset 252 and (2) the maximum pull-in time constant 250. Put another way, $T_{PULLIN}$ 246=MIN ($T_{ANCHR\_OPN\_DLY}$ 222+$T_{OFFSET}$ 252, $T_{PULLIN\_MAX\_CONST}$ 250. The term "offset" in pull-in offset 252 is used to convey that complete switching is guaranteed while including noise due to synchronization of time measurements across different blocks.

Hold time 248 is an amount of time that the coil 126 is energized to hold the armature pin in its position (e.g., in the fully-open position) for the calculated actuation time 216. The hold time 248 is a difference between the actuation time 216 and the pull-in time 246. Put another way, $T_{HOLD}$ 248=$T_{ACT}$ 216−$T_{PULLIN}$ 246.

It should be understood that, although the systems and methods for on-time correction for injector switching delays are described herein with regard to reductant injectors in exhaust aftertreatment systems, the systems and methods described herein may be implemented similarly in other types of injection systems. For example, in some implementations, the systems and methods for on-time correction for injector switching delays are utilized with unburned hydrocarbon (e.g., fuel) injectors in exhaust aftertreatment systems. In other implementations, the systems and methods for on-time correction for injector switching delays are utilized with engine fuel injectors.

Figure 3:
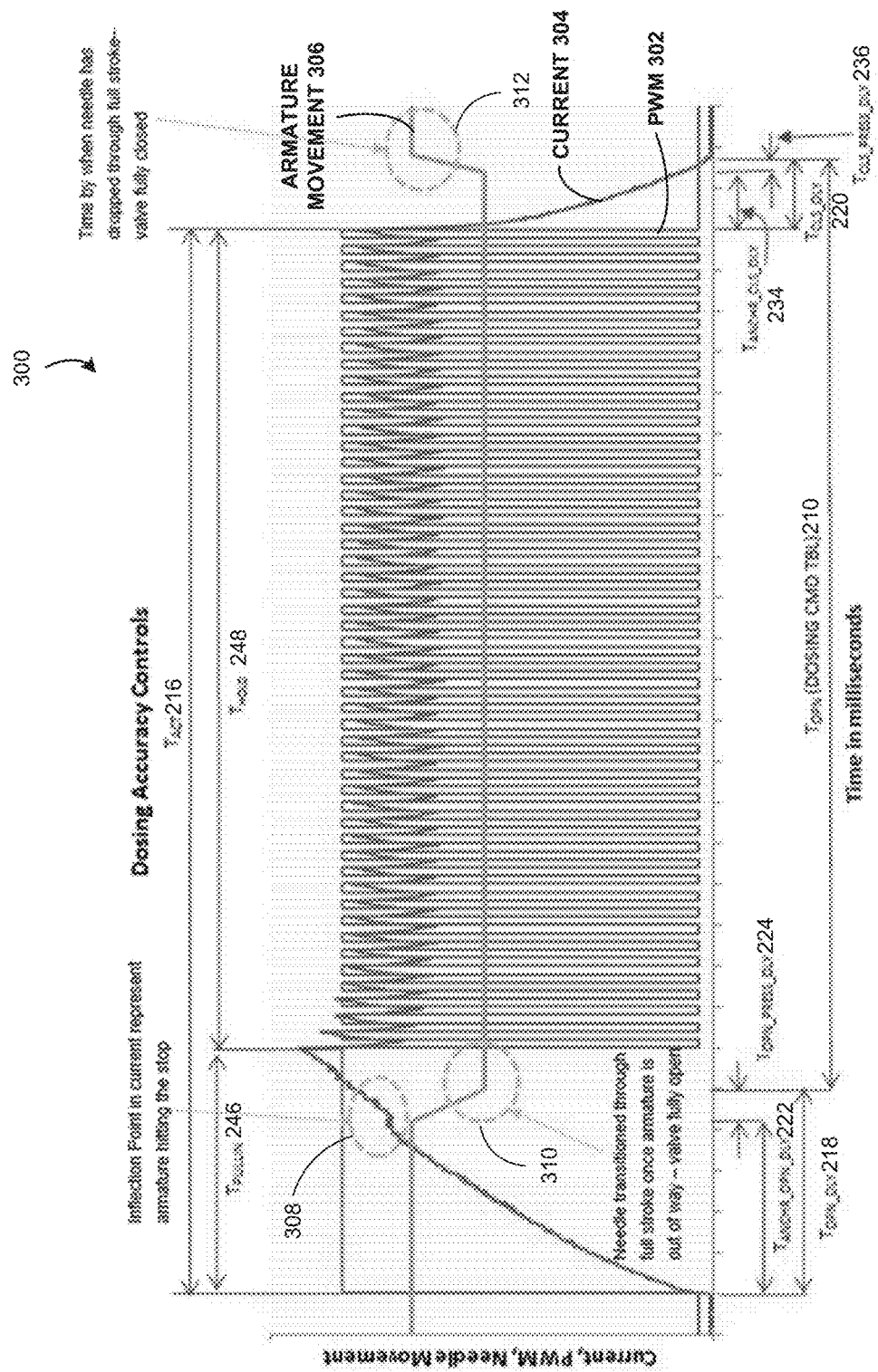
FIG. 3 is a diagram illustrating an injector dosing waveform, according to an example embodiment.

FIG. 3 is a diagram illustrating an injector dosing waveform 300, according to an example embodiment. The waveform 300 includes injector current 302, PWM 304, and armature position 306 over time. The waveform 300 illustrates various control parameters described above in connection with FIG. 2. In particular, the waveform 300 illustrates reductant injector valve open time ($T_{OPN}$) 210, actuation time ($T_{ACT}$) 216, open delay time ($T_{OPN\_DLY}$) 218, close delay time ($T_{CLS\_DLY}$) 220, anchor open delay time ($T_{ANCHR\_OPN\_DLY}$) 222, open pressure delay time ($T_{OPN\_PRESS\_DLY}$) 224, anchor close delay time ($T_{ANCHR\_CLS\_DLY}$) 234, close pressure delay time ($T_{CLS\_PRESS\_DLY}$) 236, pull-in time ($T_{PULLIN}$) 246, and hold time ($T_{HOLD}$) 248.

According to various embodiments and as illustrated in FIG. 3, certain parameters of the control schema are defined in regard to certain characteristics of one or more of the injector current 302, PWM 304, and armature position 306 of the armature pin 122. For example, 308 illustrates anchor open delay time 222. As mentioned above, anchor open delay time 222 is an amount of time until the armature pin 122 begins to move due to magnetic force in response to the coil 126 being energized. As shown in FIG. 3, anchor open delay time 222 may be indicated at 308 by an inflection point in the injector current 302, which represents the armature pin 122 hitting the stop. The armature position 306 also begins to change at 308.

310 illustrates open delay time 218. As mentioned above, open delay time 218 is an amount of time it takes for the armature pin 122 to reach a fully open position from a fully closed position upon the coil 126 being energized. As shown in FIG. 3, open delay time 218 may be indicated at 310 upon the armature position 306 reaching a full stroke open position. At this point, the armature pin 122 has transitioned through its full stroke so that the reductant injector 116 is in a fully-open position. Put another way, open delay time 218 is a first amount of time taken to move the armature out of the way—until it hits the pole core stop—plus a second amount of time for needle to transition through its full stroke so that the valve is fully open.

310 illustrates close delay time 220. As mentioned above, close delay time 220 is an amount of time it takes for the armature pin 122 to reach the fully closed position from the fully open position upon the coil 126 being de-energized. As shown in FIG. 3, close delay time 220 may be indicated at 312 upon the armature position 306 reaching a full stroke closed position. At this point, the armature pin 122 has transitioned through its full stroke so that the reductant injector 116 is in a fully-closed position. Put another way, close delay time 220 is a first amount of time taken for the needle to return to its closed position after the armature has been de-energized so that valve is fully sealed. In some embodiments, the final "ON" time can be adjusted for any leakage that occurs during transition of needle movement during the open and close delay time 218, 220 periods. One of the methods to detect this is through an empirical approach.

The schematic flow chart diagrams and method schematic diagrams described above are generally set forth as logical flow chart diagrams. As such, the depicted order and labeled steps or processes are indicative of representative embodiments. Other steps, processes orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A controller, comprising:
    a switching delay circuit structured to:
        determine an open delay time based on battery voltage and reductant injector coil temperature, the open delay time relating to a first amount of time required for an armature pin of a reductant injector to reach a fully open position from a fully closed position in response to a reductant injector coil of the reductant injector being energized, and
        determine a close delay time based on battery voltage and reductant injector coil temperature, the close delay time relating to a second amount of time required for the armature pin to reach the fully closed position from the fully open position in response to the reductant injector coil being de-energized; and
    a dosing circuit structured to:
        determine an open time relating to a third amount of time that the armature pin must be in the fully open position so as to cause the reductant injector to inject a first quantity of reductant,
        determine an actuation time based on each of the open time, the open delay time, and the close delay time, the actuation time relating to a fourth amount of time that the reductant injector coil must be energized so as to cause the reductant injector to inject the first quantity of reductant, and
        transmit a switching command signal to the reductant injector to energize the reductant injector coil for the calculated actuation time so as to cause the reductant injector to inject the first quantity of reductant into an exhaust gas stream.

2. The controller of claim 1, wherein the actuation time is a sum of (1) the open time and (2) a difference between the open delay time and the close delay time.

3. The controller of claim 1, further comprising an operating conditions circuit structured to:
    determine exhaust temperature by interpreting a received exhaust temperature value;
    determine a reductant tank temperature by interpreting a received reductant tank temperature value; and
    determine the reductant injector coil temperature based on each of the exhaust temperature value and the reductant tank temperature value.

4. The controller of claim 3, wherein the operating conditions circuit is further structured to:
    determine a dosing command temperature factor based on the actuation control signal, the dosing command temperature factor relating to an increase in the reductant injector coil temperature based on a duty cycle of the actuation control signal,
    wherein the reductant injector coil temperature is estimated further based on the dosing command temperature factor.

5. The controller of claim 1, wherein the open delay time comprises an anchor open delay time and an open pressure delay time, the anchor open delay time relating to a fifth amount of time until the armature pin begins to move in response to the reductant injector coil being energized, the open pressure delay time relating to a pressure of the reductant at the reductant injector.

6. The controller of claim 5, wherein the anchor open delay time comprises a difference between an anchor open delay maximum value and an anchor open delay compensation value, the anchor open delay maximum value relating to a maximum time required before the armature pin begins to move in response to the coil being energized, the anchor open compensation value defining an offset from the anchor open delay maximum value based on the battery voltage and the reductant injector coil temperature.

7. The controller of claim 1, wherein the close delay time comprises an anchor close delay time and a close pressure delay time, the anchor close delay time relating to a fifth amount of time until the armature pin begins to move in response to the reductant injector coil being de-energized, the close pressure delay time relating to a pressure of the reductant at the reductant injector.

8. The controller of claim 7, wherein the anchor close delay time comprises a sum of an anchor close delay minimum value and an anchor close delay compensation factor, the anchor close delay minimum value relating to a minimum time required before the armature pin begins to move in response to the coil being energized, the anchor close delay compensation factor defining an offset from the anchor close delay minimum value based on the battery voltage and the reductant injector coil temperature.

9. The controller of claim 1, further comprising a leakage circuit structured to:
    determine a leakage delay relating to a sixth amount of time until a change in reductant pressure is detected relative to current being provided to the reductant injector;

determine a leakage amount based on the leakage delay; and adjust the actuation time to compensate for the leakage amount.

10. The controller of claim 1, wherein the switching command signal comprises a pull-in phase and a hold phase, the hold phase including modulating power provided to the reductant injector between on and off levels.

11. The controller of claim 10, wherein power is modulated in the hold phase via pulse width modulation.

12. A method, comprising:
determining an open delay time based on battery voltage and reductant injector coil temperature, the open delay time relating to a first amount of time required for an armature pin of a reductant injector to reach a fully open position from a fully closed position in response to a reductant injector coil of the reductant injector being energized;
determining a close delay time based on battery voltage and reductant injector coil temperature, the close delay time relating to a second amount of time required for the armature pin to reach the fully closed position from the fully open position in response to the reductant injector coil being de-energized;
determining an open time relating to a third amount of time that the armature pin must be in the fully open position so as to cause the reductant injector to inject a first quantity of reductant;
determining an actuation time based on each of the open time, the open delay time, and the close delay time, the actuation time relating to a fourth amount of time that the reductant injector coil must be energized so as to cause the reductant injector to inject the first quantity of reductant; and
transmitting a switching command signal to the reductant injector to energize the reductant injector coil for the calculated actuation time so as to cause the reductant injector to inject the first quantity of reductant into an exhaust gas stream.

13. The method of claim 12, wherein the actuation time is a sum of (1) the open time and (2) a difference between the open delay time and the close delay time.

14. The method of claim 12, further comprising:
determining exhaust temperature by interpreting a received exhaust temperature value;
determining a reductant tank temperature by interpreting a received reductant tank temperature value; and
determining the reductant injector coil temperature based on each of the exhaust temperature value and the reductant tank temperature value.

15. The method of claim 14, further comprising:
determining a dosing command temperature factor based on the actuation control signal, the dosing command temperature factor relating to an increase in the reductant injector coil temperature based on a duty cycle of the actuation control signal,
wherein the reductant injector coil temperature is estimated further based on the dosing command temperature factor.

16. The method of claim 12, wherein the open delay time comprises an anchor open delay time and an open pressure delay time, the anchor open delay time relating to a fifth amount of time until the armature pin begins to move in response to the reductant injector coil being energized, the open pressure delay time relating to a pressure of the reductant at the reductant injector.

17. The method of claim 16, wherein the anchor open delay time comprises a difference between an anchor open delay maximum value and an anchor open delay compensation value, the anchor open delay maximum value relating to a maximum time required before the armature pin begins to move in response to the coil being energized, the anchor open compensation value defining an offset from the anchor open delay maximum value based on the battery voltage and the reductant injector coil temperature.

18. The method of claim 12, further comprising:
determining a leakage delay relating to a sixth amount of time until a change in reductant pressure is detected relative to current being provided to the reductant injector;
determining a leakage amount based on the leakage delay; and
adjusting the actuation time to compensate for the leakage amount.

19. The method of claim 12, wherein the switching command signal comprises a pull-in phase and a hold phase, the hold phase including modulating power provided to the reductant injector between on and off levels.

20. A system, comprising:
a battery;
a reductant injector, comprising:
a coil, and
an armature pin in operative engagement with the coil, the armature pin structured to move between a fully closed position and a fully open position in response to the coil being energized; and
a controller operatively coupled to the battery and the injector, the controller structured to:
interpret a battery voltage of the battery,
interpret a coil temperature of the coil,
determine an open delay time based on the battery voltage and the coil temperature,
determine a close delay time based on the battery voltage and the coil temperature,
determine an open time relating to a first amount of time that the armature pin must be in the fully open position so as to cause the reductant injector to inject a first quantity of reductant,
determine an actuation time based on each of the open time, the open delay time, and the close delay time, the actuation time relating to a second amount of time that the reductant injector coil must be energized so as to cause the reductant injector to inject the first quantity of reductant, and
transmit a switching command signal to the reductant injector to energize the reductant injector coil for the calculated actuation time so as to cause the reductant injector to inject the first quantity of reductant into an exhaust gas stream.

21. The system of claim 20, wherein the actuation time is a sum of (1) the open time and (2) a difference between the open delay time and the close delay time.

22. The system of claim 20, further comprising an operating conditions circuit structured to:
determine exhaust temperature by interpreting a received exhaust temperature value;
determine a reductant tank temperature by interpreting a received reductant tank temperature value; and
determine the reductant injector coil temperature based on each of the exhaust temperature value and the reductant tank temperature value.

23. The system of claim 20, wherein the switching command signal comprises a pull-in phase and a hold phase, the hold phase including modulating power provided to the reductant injector between on and off levels.

24. The system of claim 20, wherein the open delay time comprises an anchor open delay time and an open pressure delay time, the anchor open delay time relating to a fifth amount of time until the armature pin begins to move in response to the reductant injector coil being energized, the open pressure delay time relating to a pressure of the reductant at the reductant injector.

25. The system of claim 20, wherein the close delay time comprises an anchor close delay time and a close pressure delay time, the anchor close delay time relating to a fifth amount of time until the armature pin begins to move in response to the reductant injector coil being de-energized, the close pressure delay time relating to a pressure of the reductant at the reductant injector.

* * * * *